June 2, 1936.    J. M. SWASEY    2,043,019
UMBRELLA MIRROR
Filed Dec. 20, 1934
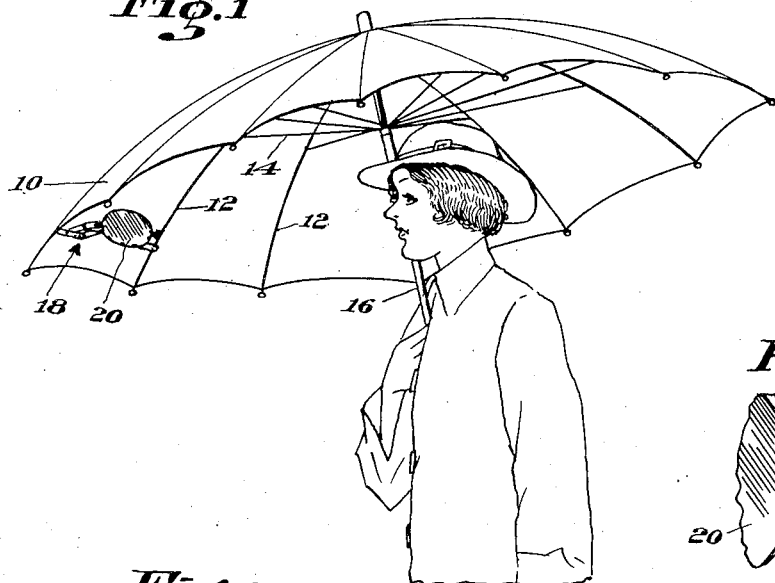
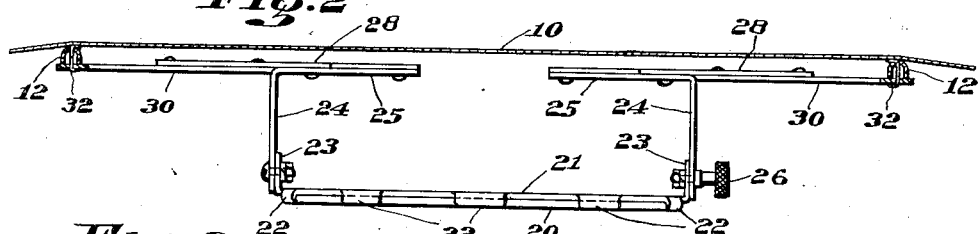
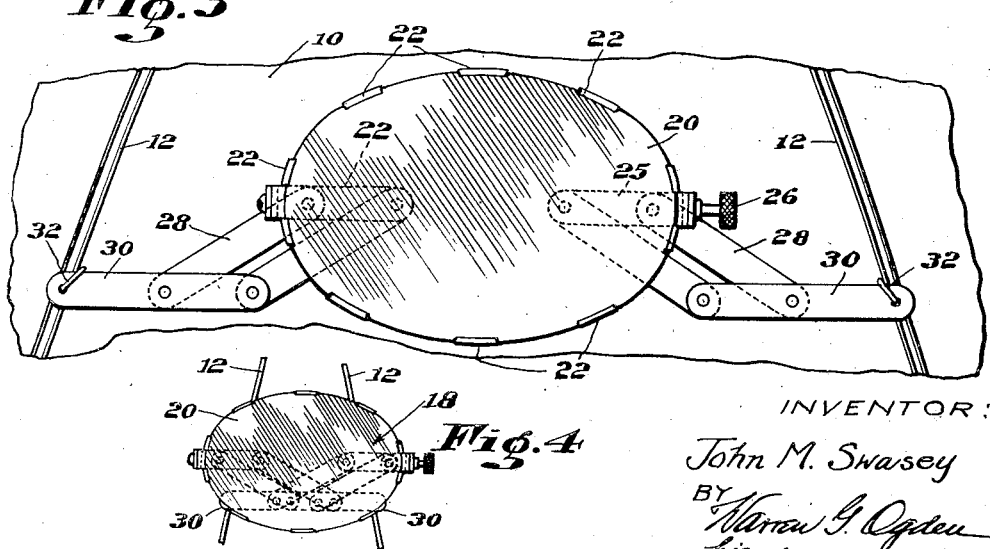
INVENTOR:
John M. Swasey
BY Warren G. Ogden
his ATTORNEY Patented June 2, 1936

2,043,019

UNITED STATES PATENT OFFICE 2,043,019

UMBRELLA MIRROR

John M. Swasey, Boston, Mass.

Application December 20, 1934, Serial No. 758,480

4 Claims. (Cl. 88—92)

This invention relates to an attachment for umbrellas enabling the person carrying the umbrella to obtain a side or rear view. It will be understood that in this specification the term "umbrella" is used as inclusive of parasols, sun shades and similar articles.

In carrying out the object of the invention a mirror is provided having a support enabling it to be easily attached to the cover of an umbrella in such position it will reveal all that may be at one side of or behind the user. To this end the mirror is attached between two spreading ribs near the outer ends thereof or toward the edge of the umbrella cover so as always to be, or readily brought into, the horizontal line of vision of the user by tilting the umbrella slightly. Furthermore the mirror of this invention is pivotally mounted on a horizontal axis so that when the umbrella stick is carried at different angles due to weather conditions, the user may adjust the mirror to the proper angle to secure a complete view to the rear or to one side. By rotating the umbrella stick slightly the mirror will function to give a backward view over either shoulder as may be desired.

Other features of the invention relate to certain combinations and arrangements of parts which possess advantages in simplicity of construction and adaptability to an open or to a closed umbrella which will be apparent to those skilled in the art from the following description.

The nature and scope of the invention will be best understood from a description of the preferred embodiment thereof illustrated in the accompanying drawing, in which:

Figure 1 is a view, in perspective, of an open umbrella with the mirror attachment in use;

Fig. 2 is a view, in plan, of the mirror and its support, shown attached to two ribs of an umbrella the cover of which is shown in section;

Fig. 3 is a view, in elevation, of the parts shown in Fig. 2;

Fig. 4 is a view, in elevation, showing the mirror support in its collapsed position when the umbrella is not in use or with its cover down; and Fig. 5 is a detail view, in perspective, showing the manner in which the mirror may be pivotally mounted on its support.

In the embodiment of the invention illustrated in the drawing the cover of the umbrella is designated 10, its spreading ribs 12, its stay ribs 14 and its stick 16. As illustrated by Fig. 1 the mirror 20 is mounted upon a collapsible or folding support, designated as a whole by 18, which is carried by the cover 10 between two of its spreading ribs 12.

Referring to Figs. 2 and 3, which illustrate the invention as carried by an open umbrella, the mirror 20 may be secured to its support in any convenient manner as by mounting on a backing plate 21 having spaced peripheral ears 22 bent inward to form a holding bezel. The mirror may be of any shape but whatever shape is selected it may be mounted for adjustment, preferably about a horizontal axis, in the following simple manner. Three ears 22 are provided at each end of the plate 21 the central ear 23 being bent outward, or backward from the mirror (see Figs. 2 and 5) and being secured to the rearwardly extending arms 24 of angular bars, constituting mirror holders, by horizontal pivot pins as shown. Each pivot pin is threaded into the ear 23 and, to insure the retention of any position to which the mirror may be adjusted by a tilting relatively to the umbrella cover, a lock washer is shown as set beneath each pivot pin nut. For ease in tilting the mirror one of the pivot pins may carry a knurled head or other finger piece 26 at its outer end. The bars 24 serve to hold the mirror away from the umbrella cover to permit of its being tilted as desired.

The support 18, which is attached to two adjacent spreading ribs 12, should be so designed as to retain the mirror on said ribs when the umbrella is open or closed and automatically to snap the mirror in place whenever the umbrella is opened. To this end each mirror holder has a pair of parallel links 28 pivoted to its inwardly turned arm 25, these links being pivoted at their other ends to a laterally extending anchor bar 30. The links maintain each pair of arms 25 and bars 30 parallel. The frame 18 is mounted between two adjacent spreading ribs 12 by anchoring the bars 30 thereto. This may be done in any suitable or convenient way for example as illustrated wherein a wire-loop rivet 32 is passed through holes in the bar and in the rib, having its ends bent inward about the rib.

The anchor bars 30 are proportioned to hold the mirror fairly rigid when the umbrella is open, that is, the extreme spread of the parallel link motion is preferably equal to the spread of the two ribs at the point where it is attached. This may be variable for different makes of umbrellas. When the umbrella is closed, collapsing the spreading ribs, the mirror support 18 also collapses, the parallel link motions being moved inward behind the mirror by the inwardly moving anchor bars 30 as shown by Fig. 4. Within a closed umbrella the mirror lies loosely between the folds of its cover. The parallel link motion between two anchoring bars thus functions to automatically open or close the mirror support as the umbrella is opened or closed.

Those skilled in the art will understand that this invention may be obtained and attached to an umbrella by the user or it may form a part of the umbrella equipment when the umbrella is first purchased.

The nature and scope of the invention having been indicated and its preferred embodiment having been specifically described, what is claimed as new, is:—

1. In combination, an umbrella having cover-spreading ribs, a mirror, a mirror support having laterally extending anchoring bars attached to two adjacent spreading ribs toward their outer ends, said mirror support embodying parallel link motions which are interposed between each anchor bar and the mirror permitting the support to collapse and lie within a fold of the umbrella cover when the umbrella is closed.

2. The combination with an umbrella of a mirror, a holder at the rear of the mirror, and supporting means extending laterally one from each end of the holder, means at the outer ends of said supporting means attached to a pair of umbrella ribs adjacent their free ends, and said supporting means embodying a longitudinally folding structure which automatically folds and lies in the folds of the umbrella when the umbrella is closed.

3. An attachment for an umbrella consisting of a mirror, a mirror holder comprising two rearwardly extending bars having arms at their rear ends turned parallel to the mirror, a pair of links each pivoted at one end to one of said arms and each pivoted at its other end to an anchoring bar, and a like pair of links similarly connecting the other arm to a second anchoring bar.

4. The combination with an umbrella or the like having spreading ribs and a flexible cover, of a rear-view mirror having supporting means extending from opposite ends thereof and attached to a pair of ribs at the inner-side of the umbrella adjacent the expansible edge of the same and lying between the pair of spreading ribs substantially in horizontal alinement with the vision of a person holding the umbrella in an upright and open condition, said supporting means being relatively foldable, whereby the mirror will lie between the folds of the flexible cover in the closed position of the umbrella.

JOHN M. SWASEY.